D. H. WILSON.
ELECTRIC WELDING SYSTEM.
APPLICATION FILED FEB. 23, 1917.

1,306,294.

Patented June 10, 1919.
3 SHEETS—SHEET 3.

Inventor:
David H. Wilson
By Williams & Pritchard
his attorneys.

UNITED STATES PATENT OFFICE.

DAVID H. WILSON, OF FRANKLIN TOWNSHIP, BERGEN COUNTY, NEW JERSEY.

ELECTRIC WELDING SYSTEM.

1,306,294.      Specification of Letters Patent.      Patented June 10, 1919.

Application filed February 23, 1917. Serial No. 150,539.

*To all whom it may concern:*

Be it known that I, DAVID H. WILSON, a citizen of the United States, and a resident of Franklin township, in the county of Bergen and State of New Jersey, have invented certain new and useful Improvements in Electric Welding Systems, of which the following is a specification.

My invention relates to electric welding with an arc.

One object of my invention is to enable a plurality of operators each with his electric welding tool or pencil to draw and maintain an arc from a common source of power designed particularly to supply power for such local uses, without interference between the arcs.

It has been common heretofore to connect a series of operators' welding tools to a common source of power.

In recent welding developments however, it has been found desirable to build electric generators, preferably motor generators, to supply the particular character and degree of welding current which may be desired. Such generators have been built for a single arc, or for two or three or more arcs. The object of my invention is to so design such a welding system as to enable the various operators to weld without interfering with each other.

When such welding outfits are connected to a large source of power circuit for house and factory power and lighting, such an element of interference between the operators, of course, does not exist. But when operators have outfits connected to a small source of power, such that when one operator starts his arc, there is a considerable drop in the potential of the generator, the arcs of other operators may be broken or disrupted.

In the drawings:—

Fig. 4 is a section of a detail.

Figure 1:
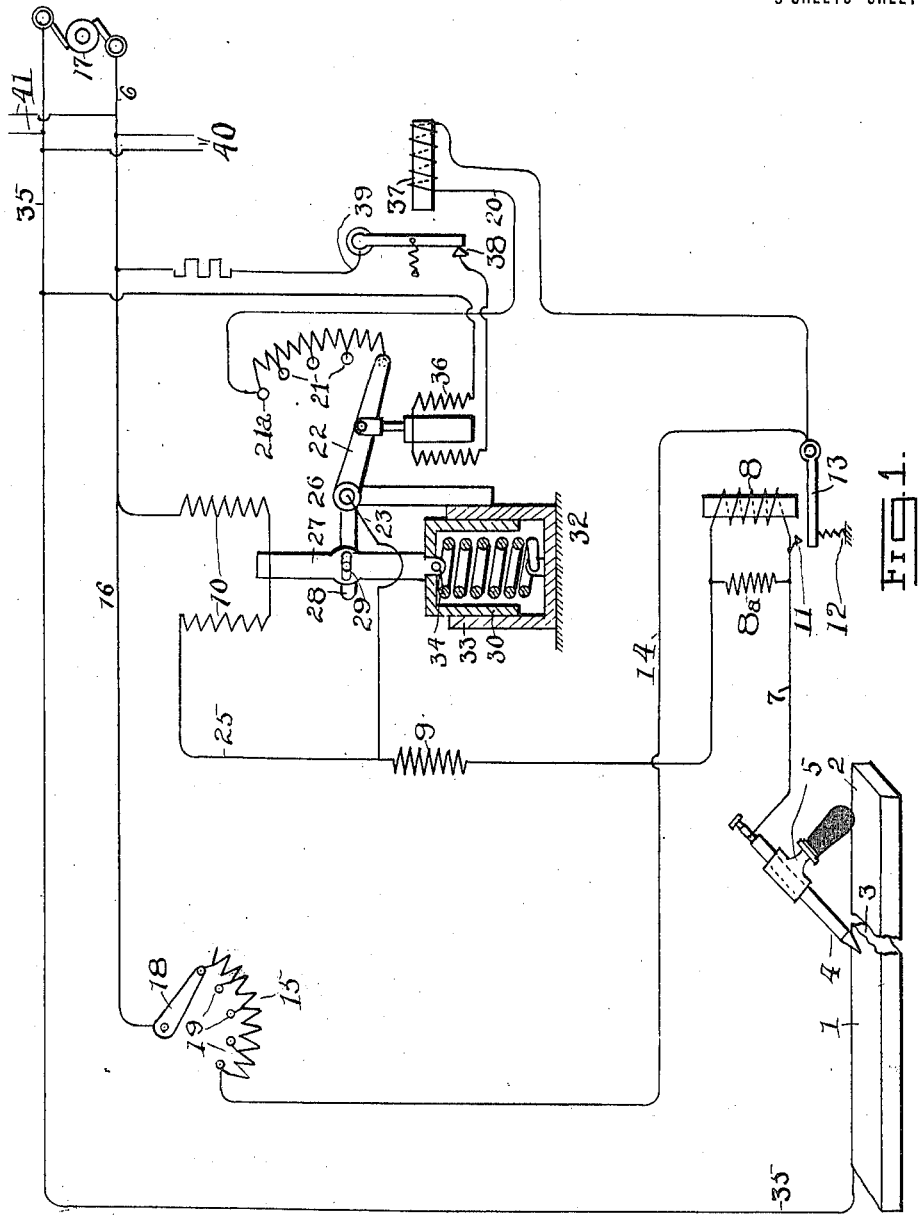
Figure 1 shows a diagram view of my invention.

In Fig. 1 two portions of metal 1 and 2 are shown having a crack 3 adapted to be welded by means of the welding tool 4. The welding tool is held by an insulating handle 5 and is normally connected to a conductor 6 leading to a generator or other source of current 17 over the following circuit; conductor 7, magnetic coil 8, shunt 8$^a$ in multiple therewith, resistance 9 and solenoid coil 10 to conductor 6. When the tool 4 is touched to the metal at 5 a current passes over this circuit which should have a minimum volume of perhaps about 25 amperes. The initial circuit automatically closes the open pair of contacts 11 held normally open by the spring 12 adapted to close branch circuits arranged to deliver an additional amount of current to the welding tool. The first of these branch circuits may be traced from the conductor 7 through the closed pair of contacts 11, retracted by spring 12, the armature 13, conductor 14, rheostat 15, conductor 16, thence through the line conductor 6 to the source of current indicated at 17. The rheostat 15 is designed and constructed to be operated by hand and may be set in a number of positions for the purpose of arbitrarily fixing the major amount of current intended to be delivered to the tool 4 for the particular welding operation in hand. The arm 18 of the rheostat may be swept over the contacts 19 to introduce such variable resistance as will permit the passage of say 25 or 50 or 75 or 100 or 125 amperes, as may be desired.

A second branch circuit is also established by the circuit closer 8 which may be traced as follows; conductor 7, contacts 11, armature 13, conductor 20, circuit breaker 37, conductor 20, the variable resistance 21 of the automatic rheostat, arm 22 of the rheostat, conductor 23, choke coil 24, conductor 25, solenoid 10, conductor 6 and generator 17. This branch circuit just traced may introduce a variable resistance between the tool 4 and the weld 3. This resistance at the tool varies to such an extent as would tend to vary the amperage by an amount from zero to 15 amperes or more. The variable resistance 21 should therefore have the resistances between its points so adjusted as to compensate to a considerable degree for the variation at the tool. The arm 22 of the automatic rheostat is turned upon its pivot 26 by means of the core 27 of the solenoid which is operatively connected to the arm 28 at the lever by the pin and slot 29. The core 27 is normally retracted to the position shown in the drawing by means of the coil spring 30, one end of which is secured to the projection 34 of the core 27 and the other end secured to a fixed base 32. In order to render the movements of the core 27 sluggish, a dash pot is employed one portion of which 35 is secured to the base and the other portion of which is secured to the core 27 as shown.

When current is caused to pass through the tool 4 and weld 3 the solenoid coil 10 pulls upon the core 27 raising the arm 28 of the lever causing the arm 22 of the lever to pass over the various contact points 21 of the variable resistance until the pull of the solenoid coil balances the increasing pull of the spring 30 after which the arm 22 comes substantially to rest. If the resistance between the tool 4 and the weld 3 increases it causes a reduction of current in the solenoid 10 which permits the spring 3 to retract the core 27 thereby reducing the resistance at 21 and thus maintaining the flow of the current through the conductor 20 to the tool 4. If the resistance at the tool is decreased a stronger pull upon the core 27 is exerted by the solenoid 10 thereby automatically introducing a greater portion of the resistance 21 into the circuit with the tool thereby also maintaining the flow of current through the tool.

When the tool 4 is first applied to the weld it is desired to prevent a rush of current over the resistance 21. If the arm 22 under the tension of spring 30 rested on the lowest resistance point 21ª, such a rush would occur, and the fused metal would be splashed around. To prevent this a solenoid 36 is introduced in a normally closed circuit bridged across the line conductors 6 and 35 to hold the arm 23 in the position to introduce a considerable resistance into the circuit of the tool 4 until the solenoid coil 10 exerts its influence upon the automatic resistance varying device 21. The current through the solenoid 10 flows also through the coil 27 and opens the contacts 38 held normally closed by spring 39 at the same instant that the solenoid exerts its balancing pull on the core 27. The arm 22 sweeps over the resistance 21 reducing the amount of resistance in the circuit until the balance is established.

The line conductors 6 and 35 from the generator 17 may supply a current of say 50 volts (a constant potential) and from 100 to 500 amperes. The resistance rheostat may vary from 19 to about 2 ohms or more.

A shunt 8ª may pass the greater portion of the welding current about the circuit closer 8.

It will be noted that when the welding tool 4 is brought into contact with the work, current first flows through the branch 25 thereby closing the contacts 11 and introducing the adjustable resistance 21 which reduces the circuit resistance as required for drawing the arc.

An additional adjustable rheostat 15 is employed adapted to be manually adjusted as to its resistance and adapted to complete the welding circuit when the current flowed through the welding tool. The amount of resistance reduction depends upon the position of the rheostat switch arm 18 and the means for removing an adjustable portion of the resistance from the circuit consists in the conductors 16 and 14 which are brought into the welding circuit by the contacts 11.

Suitable apparatus well known to engineers may be employed in place of the diagrammatic apparatus shown.

Any kind of heating current suitable for welding may be employed, and the main purpose of my invention is to measure an even heat in the arc, regardless of the resistance of the arc or of the character of the current.

Figure 2:
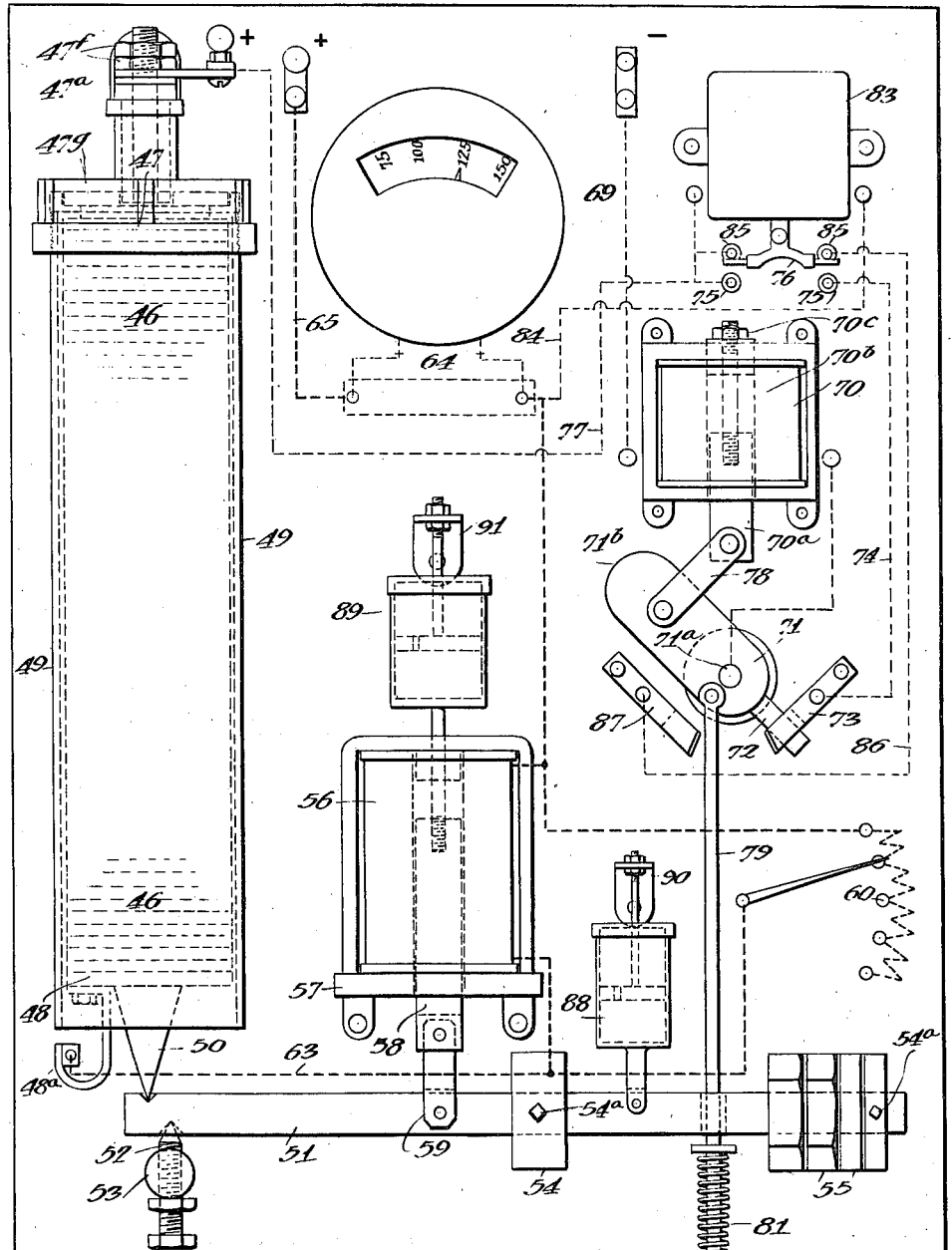
Fig. 2 shows a front elevation of another form of my invention.

Another form of my invention is shown in the Fig. 2. In this figure is shown a back board or panel 45 upon which are mounted various electrical and mechanical devices. Upon the left hand side of this panel is shown a carbon pile 46. This pile is composed of plates or disks of carbon mounted between a top fixed abutment at 47 mounted on the bracket 47ª and the bottom plate 48, each adapted to receive an electrical connection. The pile may, if desired, be inclosed within a cylinder 49, the inside of which may be covered with a lining of insulating material, enamel for example, to prevent electrical contact with the edges of the disks. This cylinder is not necessary however. The upper abutment 47 has a threaded post 47ᵇ, insulated by the bushing 47ᶜ, and washers 47ᵈ from the cylinder 49. The cap 47ᵉ is screwed to the cylinder 49. The nuts 47ᶠ secure the whole construction to the bracket 47ª. The bottom plate 48 is provided with a post 50 engaging a lever 51, which is fulcrumed upon an adjustable support or screw 52 mounted in the fixed support 53. Upon the other side of the fulcrum are mounted weights 54 and 55. These weights are adapted to be shifted along the lever to vary the pressure upon the pile. Some of the weights 55 may be removed in order to secure the proper pressure upon the pile. Set screws 54ª may be used to hold them in position. The pressure upon the pile is adapted to be reduced by an electro-responsive device or solenoid shown at 56. Within the solenoid, which is fixed and mounted upon the bracket 57 is a core 58 suitably attached by a link 59 to the lever 51. During the operation of welding the welding current passes through the solenoid 56, and lifts the core 58 thereby lifting the right hand end of the lever, 51, thereby reducing the pressure upon the carbon pile 46. A rheostat 60 may be introduced into the circuit in multiple with the solenoid 56 for the purpose of adjusting its strength and for the purpose of adjusting the amount of current traveling through the solenoid.

Figure 3:
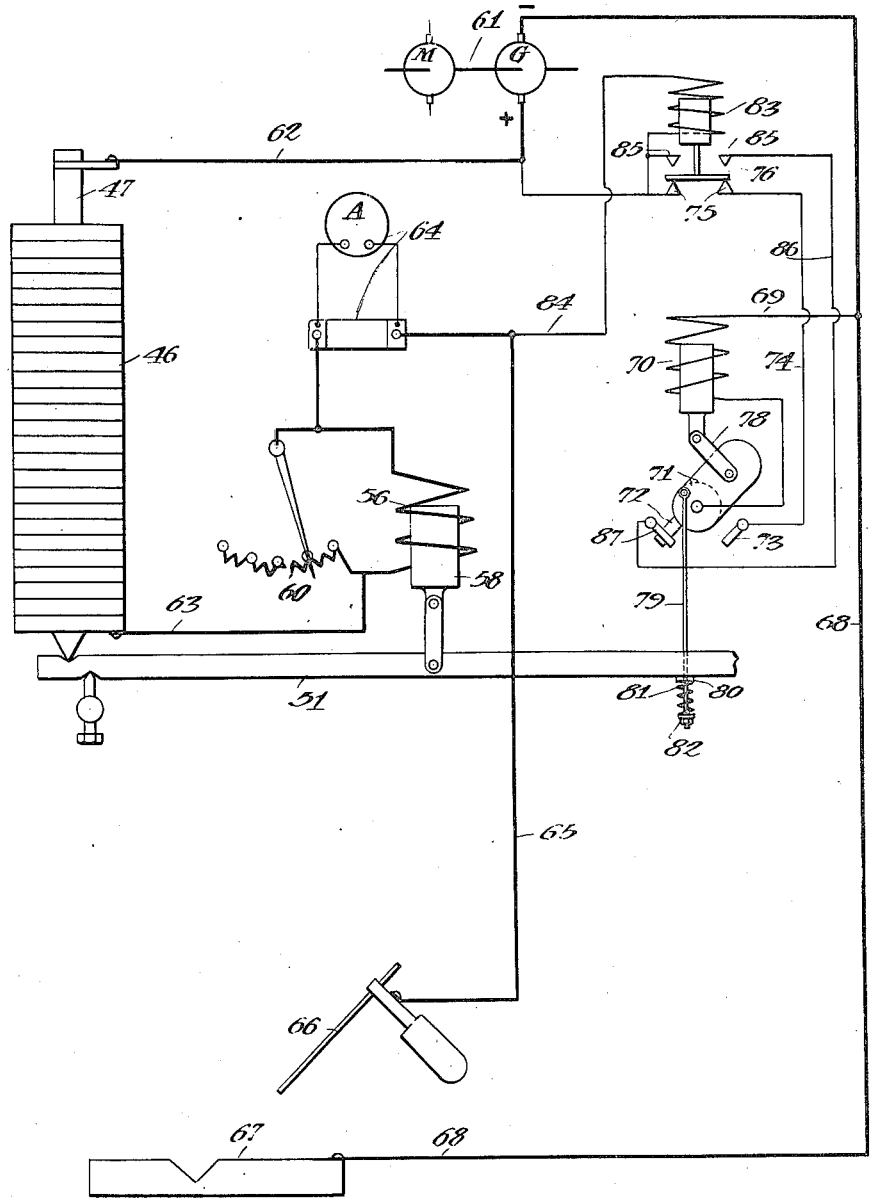
Fig. 3 shows the circuits thereof in diagram.

The operating circuit of these devices is shown more clearly in Fig. 3. A motor generator set 61 is preferably employed. It may generate a current having a potential of 60 to 75 volts, or any other suitable current that may be desired. Preferably from the positive pole of the generator is connected a conductor 62 which is connected to the carbon pile 46, the other end of which pile is connected by a conductor 63 through the solenoid 56 and rheostat 60, through the meter and its shunt 64, through the conductor 65 to the welding tool, electrode or terminal 66 adapted to be brought into contact with the work 67. The work is connected by a conductor 68 to the negative terminal of the generator 61. When the generator is in operation and the welding current traverses the circuits thus described, it passes through the carbon pile and solenoid and across the terminals 66 and 67 through an arc. The resistance of this arc is varied by different causes, by the irregularities of the operator's hand during welding, by the distance between the tool 66 and the portions of the work 67 which an arc may reach, by the cooling effect of the mass of metal at 67, by the varying temperatures surrounding the same, and perhaps by other causes. As the resistance varies in the arc, the tendency is to alter the flow of current across the arc. The moment the current starts to vary it has a corresponding effect upon the solenoid 56, so that it attracts its core with greater or less strength, and either reduces or increases the pressure upon the pile thereby reducing or increasing the flow of current through the pile. The joint effects of these various influences is that when the resistance of the arc increases at the voltage of the current from the generator groups, the rest of the apparatus tends to reduce the resistance of the rest of the circuit to compensate for it and vice versa, thereby maintaining substantially a steady flow of current across the arc, and thereby maintaining such a flow of metal as to create an even and smooth deposit of metal from the metal terminal 66 to the work 67. When the potential of 60 to 75 volts is employed at the generator, the first contact between the terminal 66 and 67 is apt to create a rush of current and a spattering of metal that are objectionable. I employ means to prevent it. For this purpose a resistance is introduced into the circuit when the arc is started to prevent this rush of current. This resistance is introduced by the carbon pile 65. The circuits relating to this function are as follows:

From the conductor 68, the circuit is led through the conductor 69 to the electro-responsive device or solenoid 72 having a core linked to the switch 71 rotatable on its member 71ª, and weighted at 71ᵇ, carrying an arm 72. This arc during welding engages the spring contact 73 establishing a circuit through the conductor 74 to contacts 75 (disconnected by the bridge 76 during welding) and by the conductors 77 and 62 to the generator. The core of the solenoid 70 is connected eccentrically to the switch by the link 78. To the switch 71 is also eccentrically pivoted the supporting rod 72 carrying the abutment 80 supported loosely on the rod by the spring 81 which in turn is carried by his adjustable support 82 threaded to the rod. In Fig. 3 the abutment 80 is shown in a position ready for welding before the arc is drawn. In Fig. 2 it is shown in the position during welding.

The electro-responsive device or solenoid 83 is also shown connected in multiple with the carbon pile and solenoid 56, through the conductors 84 and 77ª. It is adapted to lift the bridge 76 from its normal position across contacts 75 to cross connect contacts 85 during welding, to transfer the solenoid 70 from circuit 74 and contact spring 73 into contact with contacts 85, conductor 26 and spring contact 27.

In operation when the electrode 77 is brought into contact with the work 67 and current is established through the welding circuit, current also passes through the solenoid 83, by way of the conductors 77ª and 84 with the result that the core of the solenoid 83 is lifted, and the bridge 76 leaves the contacts 75 and cross connects the contacts 85 leaving the solenoid in a circuit traced through the conductor 86 and spring 87 which when the switch 71 has been rotated has been brought as described into connection with the swinging arm 72. In the circuit shown in Fig. 2 the bridge is in contact with the contacts 85 and the swinging arm 72 is in contact with the spring 87. This is the welding position.

The starting or normal position is shown in Fig. 3. Before starting to weld the abutment 80 rests against the bottom of the lever 51, and the swinging arm 72 is in contact with the spring 87. The circuit of the solenoid 70 is opened, however, at the bridge 76 which is in contact only with contacts 75. At this time the resistance of the pile due to the lifting action of the spring 81, is sufficient when the arc is started to prevent a rush of current. When the arc is started, and current energizes the coil 83 lifting the bridge 76 away from the contacts 75, the bridge cross connects contacts 85, throwing the current through the solenoid 70, switch 71, arm 72, spring 87, conductor 86, cross connected contacts 85, conductor 77 and conductor 62 back to the generator. This energizes the coil 70, so that its core rotates the switch 71, in a direction contrary to that of the hands of the clock, swinging the arm 72 away from the spring 87 around into contact with the spring 73 thereby establishing at this point a new circuit for the solenoid circuit which is open at the contacts 75, thereby establishing the welding position.

To prevent a too violent engagement between the arm 72 and the contact springs 73 and 87, the core 70ª of the solenoid has threaded to it a rod 70ᵇ, which passes through the top of the solenoid bracket 70ᵈ and is provided with a nut 70ᵉ. This nut comes down against the top of the bracket and arrests the movement of the switch 71. When the arc is broken between the terminal 66 and 67 the coil 83 is deënergized releasing the bridge 76, so that it again cross connects contacts 75 thereby again closing the circuit of the solenoid 70, so that it is caused to operate in the reverse direction throwing its swinging arm 72 into contact with the spring 87, thus breaking the active welding circuit, and leaving the apparatus ready to start.

Dash pots 88 and 89 may, if desired, be employed to render the oscillations of the lever more sluggish. The plungers of the dash pots may be secured suitably to brackets 90 and 91 respectively fixed to the panel 45, and their cylinders may be linked directly to the lever 51 and the core 58 respectively, the core being linked to the lever 51. Oil or air or any fluid may be employed in the dash pots which may be of ordinary well known construction. These dash pots are adapted to render the lever oscillations more sluggish. Either or both may be used, but they are not an essential feature of this invention.

The spring 81 should have the right compression to open the pile sufficiently to increase its resistance sufficiently to prevent the rush of current heretofore described.

The weights may be varied until the proper adjustment is arrived at.

The rheostat 60 may be also varied, to vary the strength of the solenoid 56, and the rheostat and weights should be so varied as to properly coöperate.

A plurality of outfits similar to that connected to conductors 62 and 68 may be provided, one for the pair of conductors 40 or 40ª and another for conductors 41 or 41ª. Any number desired may be used, the capacity of the generator being gaged to suit.

In operation, an operator brings one of his electrodes into contact with the work, and draws a welding arc and then establishes the welding circuit over the circuits as heretofore described. When a second operator brings his welding electrodes into contact with the work, his starting circuit permits the passage of but a small amount of current over a circuit of considerable resistance, so that there is a small drop in the potential of the generator and less interference with another welding arc already established, than might otherwise occur. Likewise when the third operator brings his metal electrodes into contact with his work his circuit for drawing the arc contains such a high resistance that a comparatively small amount of current flows and the potential of the generator is not affected sufficiently, as a rule, to extinguish the arcs of the other two operators.

These conditions remain true so long as the operators do not draw their arcs during the operation of welding up to the limit of rupture, or near to it. My circuits and apparatus in other words, eliminate a large amount of interference between operators, and will always eliminate the interference where the arcs are not pulled out to a point near the limit of rupture.

If during the operation of welding by one operator another operator starts his arc, there is consequently a slight drop of potential in the generator. This drop has the effect of reducing the current in the solenoid which controls the automatically variable rheostat or pile of the welding operator, so that the resistance of the latter welding circuit is reduced by decreasing the resistance of the automatic rheostat. This has a tendency to maintain a more even voltage across the arc, and a more even flow of the current.

Either one of the foregoing means may be used to reduce interference between the operators or both of them may be used. When both are used, they coöperate, one complementing the other to prevent interference.

Any suitable generator may be employed in connection with the foregoing system. The generator that I have used has been a 70 volt machine having a maximum capacity of 300 to 500 amperes and capable of delivering 21 kilowatts. It was shunt wound and had a cast steel frame and pole pieces. It was driven by a motor on a two phase 50 cycle, 220 volt circuit at a speed of 1500 R. P. M. It was a so-called constant potential machine and the circuit of the shunt winding had a rheostat.

Any suitable constant potential source of power may be used with excellent results in connection with my system.

It may be also noted that the solenoid and other impedance devices furnish the means to choke off and prevent such a flow of current as to instantly drop the voltage of the generator, thus giving a period of time for the carbon pile in another operator's circuit to compensate for the drop in voltage due to starting the arc.

What I claim is:

1. In an electric welding system, a source of current to supply a plurality of welding circuits in multiple, one of said circuits provided with a pair of welding terminals adapted to be manually operated to draw The operating circuit of these devices is shown more clearly in Fig. 3. A motor generator set 61 is preferably employed. It may generate a current having a potential of 60 to 75 volts, or any other suitable current that may be desired. Preferably from the positive pole of the generator is connected a conductor 62 which is connected to the carbon pile 46, the other end of which pile is connected by a conductor 63 through the solenoid 56 and rheostat 60, through the meter and its shunt 64, through the conductor 65 to the welding tool, electrode or terminal 66 adapted to be brought into contact with the work 67. The work is connected by a conductor 68 to the negative terminal of the generator 61. When the generator is in operation and the welding current traverses the circuits thus described, it passes through the carbon pile and solenoid and across the terminals 66 and 67 through an arc. The resistance of this arc is varied by different causes, by the irregularities of the operator's hand during welding, by the distance between the tool 66 and the portions of the work 67 which an arc may reach, by the cooling effect of the mass of metal at 67, by the varying temperatures surrounding the same, and perhaps by other causes. As the resistance varies in the arc, the tendency is to alter the flow of current across the arc. The moment the current starts to vary it has a corresponding effect upon the solenoid 56, so that it attracts its core with greater or less strength, and either reduces or increases the pressure upon the pile thereby reducing or increasing the flow of current through the pile. The joint effects of these various influences is that when the resistance of the arc increases at the voltage of the current from the generator groups, the rest of the apparatus tends to reduce the resistance of the rest of the circuit to compensate for it and vice versa, thereby maintaining substantially a steady flow of current across the arc, and thereby maintaining such a flow of metal as to create an even and smooth deposit of metal from the metal terminal 66 to the work 67. When the potential of 60 to 75 volts is employed at the generator, the first contact between the terminal 66 and 67 is apt to create a rush of current and a spattering of metal that are objectionable. I employ means to prevent it. For this purpose a resistance is introduced into the circuit when the arc is started to prevent this rush of current. This resistance is introduced by the carbon pile 65. The circuits relating to this function are as follows:

From the conductor 68, the circuit is led through the conductor 69 to the electro-responsive device or solenoid 72 having a core linked to the switch 71 rotatable on its member 71$^a$, and weighted at 71$^b$, carrying an arm 72. This arc during welding engages the spring contact 73 establishing a circuit through the conductor 74 to contacts 75 (disconnected by the bridge 76 during welding) and by the conductors 77 and 62 to the generator. The core of the solenoid 70 is connected eccentrically to the switch by the link 78. To the switch 71 is also eccentrically pivoted the supporting rod 72 carrying the abutment 80 supported loosely on the rod by the spring 81 which in turn is carried by his adjustable support 82 threaded to the rod. In Fig. 3 the abutment 80 is shown in a position ready for welding before the arc is drawn. In Fig. 2 it is shown in the position during welding.

The electro-responsive device or solenoid 83 is also shown connected in multiple with the carbon pile and solenoid 56, through the conductors 84 and 77$^a$. It is adapted to lift the bridge 76 from its normal position across contacts 75 to cross connect contacts 85 during welding, to transfer the solenoid 70 from circuit 74 and contact spring 73 into contact with contacts 85, conductor 26 and spring contact 27.

In operation when the electrode 77 is brought into contact with the work 67 and current is established through the welding circuit, current also passes through the solenoid 83, by way of the conductors 77$^a$ and 84 with the result that the core of the solenoid 83 is lifted, and the bridge 76 leaves the contacts 75 and cross connects the contacts 85 leaving the solenoid in a circuit traced through the conductor 86 and spring 87 which when the switch 71 has been rotated has been brought as described into connection with the swinging arm 72. In the circuit shown in Fig. 2 the bridge is in contact with the contacts 85 and the swinging arm 72 is in contact with the spring 87. This is the welding position.

The starting or normal position is shown in Fig. 3. Before starting to weld the abutment 80 rests against the bottom of the lever 51, and the swinging arm 72 is in contact with the spring 87. The circuit of the solenoid 70 is opened, however, at the bridge 76 which is in contact only with contacts 75. At this time the resistance of the pile due to the lifting action of the spring 81, is sufficient when the arc is started to prevent a rush of current. When the arc is started, and current energizes the coil 83 lifting the bridge 76 away from the contacts 75, the bridge cross connects contacts 85, throwing the current through the solenoid 70, switch 71, arm 72, spring 87, conductor 86, cross connected contacts 85, conductor 77 and conductor 62 back to the generator. This energizes the coil 70, so that its core rotates the switch 71, in a direction contrary to that of the hands of the clock, swinging the arm 72 away from the spring 87 around into contact with the spring 73 thereby establishing at this point a new circuit for the solenoid circuit which is open at the contacts 75, thereby establishing the welding position.

To prevent a too violent engagement between the arm 72 and the contact springs 73 and 87, the core 70$^a$ of the solenoid has threaded to it a rod 70$^b$, which passes through the top of the solenoid bracket 70$^d$ and is provided with a nut 70$^c$. This nut comes down against the top of the bracket and arrests the movement of the switch 71. When the arc is broken between the terminal 66 and 67 the coil 83 is deënergized releasing the bridge 76, so that it again cross connects contacts 75 thereby again closing the circuit of the solenoid 70, so that it is caused to operate in the reverse direction throwing its swinging arm 72 into contact with the spring 87, thus breaking the active welding circuit, and leaving the apparatus ready to start.

Dash pots 88 and 89 may, if desired, be employed to render the oscillations of the lever more sluggish. The plungers of the dash pots may be secured suitably to brackets 90 and 91 respectively fixed to the panel 45, and their cylinders may be linked directly to the lever 51 and the core 58 respectively, the core being linked to the lever 51. Oil or air or any fluid may be employed in the dash pots which may be of ordinary well known construction. These dash pots are adapted to render the lever oscillations more sluggish. Either or both may be used, but they are not an essential feature of this invention.

The spring 81 should have the right compression to open the pile sufficiently to increase its resistance sufficiently to prevent the rush of current heretofore described.

The weights may be varied until the proper adjustment is arrived at.

The rheostat 60 may be also varied, to vary the strength of the solenoid 56, and the rheostat and weights should be so varied as to properly coöperate.

A plurality of outfits similar to that connected to conductors 62 and 68 may be provided, one for the pair of conductors 40 or 40$^a$ and another for conductors 41 or 41$^a$. Any number desired may be used, the capacity of the generator being gaged to suit.

In operation, an operator brings one of his electrodes into contact with the work, and draws a welding arc and then establishes the welding circuit over the circuits as heretofore described. When a second operator brings his welding electrodes into contact with the work, his starting circuit permits the passage of but a small amount of current over a circuit of considerable resistance, so that there is a small drop in the potential of the generator and less interference with another welding arc already established, than might otherwise occur. Likewise when the third operator brings his metal electrodes into contact with his work, his circuit for drawing the arc contains such a high resistance that a comparatively small amount of current flows and the potential of the generator is not affected sufficiently, as a rule, to extinguish the arcs of the other two operators.

These conditions remain true so long as the operators do not draw their arcs during the operation of welding up to the limit of rupture, or near to it. My circuits and apparatus in other words, eliminate a large amount of interference between operators, and will always eliminate the interference where the arcs are not pulled out to a point near the limit of rupture.

If during the operation of welding by one operator another operator starts his arc, there is consequently a slight drop of potential in the generator. This drop has the effect of reducing the current in the solenoid which controls the automatically variable rheostat or pile of the welding operator, so that the resistance of the latter welding circuit is reduced by decreasing the resistance of the automatic rheostat. This has a tendency to maintain a more even voltage across the arc, and a more even flow of the current.

Either one of the foregoing means may be used to reduce interference between the operators or both of them may be used. When both are used, they coöperate, one complementing the other to prevent interference.

Any suitable generator may be employed in connection with the foregoing system. The generator that I have used has been a 70 volt machine having a maximum capacity of 300 to 500 amperes and capable of delivering 21 kilowatts. It was shunt wound and had a cast steel frame and pole pieces. It was driven by a motor on a two phase 50 cycle, 220 volt circuit at a speed of 1500 R. P. M. It was a so-called constant potential machine and the circuit of the shunt winding had a rheostat.

Any suitable constant potential source of power may be used with excellent results in connection with my system.

It may be also noted that the solenoid and other impedance devices furnish the means to choke off and prevent such a flow of current as to instantly drop the voltage of the generator, thus giving a period of time for the carbon pile in another operator's circuit to compensate for the drop in voltage due to starting the arc.

What I claim is:

1. In an electric welding system, a source of current to supply a plurality of welding circuits in multiple, one of said circuits provided with a pair of welding terminals adapted to be manually operated to draw and maintain an arc, said generator and current being of such capacity and character that the starting of an arc in another circuit would naturally cause such a drop of voltage as would disrupt said first mentioned arc when already in operation and means in said first mentioned circuit tending to maintain the arc of that circuit when another arc is started.

2. In an electric welding system, a source of current to supply a plurality of welding circuits in multiple, one of said circuits provided with a pair of welding terminals adapted to be manually operated to draw and maintain an arc, said current supply being of such capacity and character that the starting of an arc in another circuit would naturally cause such a drop of voltage as would disrupt the first mentioned arc already in operation, and automatically variable resistance in the first mentioned circuit to compensate for a drop of potential of the welding current supply due to starting of the second arc.

3. In an electric welding system, a source of current to supply a plurality of welding circuits in multiple, one of said circuits provided with a pair of welding terminals adapted to be manually operated to draw and maintain an arc, said current supply being of such capacity and character that the starting of an arc in another circuit would naturally cause such a drop of voltage as would disrupt the first mentioned arc already in operation, and means in the first mentioned circuit to maintain an even heating in the arc consisting of automatically variable resistance.

4. In an electric welding system, a source of current to supply a plurality of welding circuits in multiple, one of said circuits provided with a pair of welding terminals adapted to be manually operated to draw and maintain an arc, said current supply being of such capacity and character that the starting of an arc in another circuit would naturally cause such a drop of voltage as would disrupt the first mentioned arc already in operation, and automatically variable resistance in the first mentioned circuit adapted to vary the current gradually and smoothly to compensate for a drop of potential of the welding current supply due to the starting of the second arc.

5. In an electric welding system, a source of current to supply a plurality of welding circuits in multiple, one of said circuits provided with a pair of welding terminals adapted to be manually operated to draw and maintain an arc, said current supply being of such capacity and character that the starting of an arc in another circuit would naturally cause such a drop of voltage as would disrupt the first mentioned arc already in operation, and an automatically balanced resistance in the first mentioned circuit adapted to compensate for the drop of potential of the welding current supply due to the starting of the second arc.

6. In an electric welding system, a source of current to supply a plurality of welding circuits in multiple, one of said circuits provided with a pair of welding terminals adapted to be manually operated to draw and maintain an arc, said current supply being of such capacity and character that the starting of an arc in another circuit would naturally cause such a drop of voltage as would disrupt the first mentioned arc already in operation, and an automatic electro-responsive device actuated by variations of current due to variations of resistance in the first welding arc to compensate for a drop of potential of the welding current supply due to the starting of the second arc.

7. In an electric welding system, a source of current to supply a plurality of welding circuits in multiple, one of said circuits provided with a pair of welding terminals adapted to be manually operated to draw and maintain an arc, said current supply being of such capacity and character that the starting of an arc in another circuit would naturally cause such a drop of voltage as would disrupt the first mentioned arc already in operation, and an electro-responsive device actuated by variations of current in the first welding circuit adapted to automatically vary the resistance to compensate for a drop of potential of the welding current supply due to the starting of another arc.

Signed at New York in the county of New York and State of New York this 26th day of December A. D. 1916.

DAVID H. WILSON.

Witness:
   MYRON F. HILL.